US012352357B2

(12) United States Patent
Newsome (10) Patent No.: US 12,352,357 B2
(45) Date of Patent: Jul. 8, 2025

(54) SEAL ASSEMBLY FOR A FLUID COUPLING

(71) Applicant: Eaton Intelligent Power Limited, Dublin (IE)

(72) Inventor: William H. Newsome, Dexter, MI (US)

(73) Assignee: Eaton Intelligent Power Limited, Dublin (IE)

( * ) Notice: Subject to any disclaimer, the term of this patent is extended or adjusted under 35 U.S.C. 154(b) by 602 days.

(21) Appl. No.: 17/084,851

(22) Filed: Oct. 30, 2020

(65) Prior Publication Data

US 2021/0131566 A1 May 6, 2021

Related U.S. Application Data

(60) Provisional application No. 62/928,662, filed on Oct. 31, 2019.

(51) Int. Cl.
*F16J 15/32* (2016.01)
*F16J 15/3208* (2016.01)
*F16J 15/3284* (2016.01)

(52) U.S. Cl.
CPC ....... *F16J 15/3284* (2013.01); *F16J 15/3208* (2013.01)

(58) Field of Classification Search
CPC ..... F16J 15/166; F16J 15/3208; F16J 15/3284
See application file for complete search history.

(56) References Cited

U.S. PATENT DOCUMENTS

| | | | | |
|---|---|---|---|---|
| 2,601,085 A * | 6/1952 | Brunner | ........... | F16J 15/166 277/487 |
| 2,797,971 A * | 7/1957 | Greenough | ........... | F16J 15/162 277/584 |
| 3,767,215 A * | 10/1973 | Brown | ........... | F41A 33/00 73/167 |
| 4,062,550 A | 12/1977 | Satsumabayashi et al. | | |
| 4,234,197 A * | 11/1980 | Amancharla | ........... | F16J 15/166 277/540 |
| 4,268,045 A * | 5/1981 | Traub | ........... | F16J 15/166 277/589 |
| 4,359,090 A * | 11/1982 | Luke | ........... | E21B 33/1293 166/217 |

(Continued)

FOREIGN PATENT DOCUMENTS

WO WO-2010098930 A2 * 9/2010 ............. E21B 33/10

*Primary Examiner* — Eugene G Byrd
*Assistant Examiner* — L. Susmitha Koneru
(74) *Attorney, Agent, or Firm* — Merchant & Gould P.C.

(57) ABSTRACT

A fluid coupling including a first adapter, second adapter configured to connect with and disconnect from the male adapter, inner sleeve, first seal assembly disposed in a recess of the first adapter and configured to form a fluid-tight seal between the first adapter and inner sleeve, and second seal assembly disposed in a recess of the second adapter and configured to form a fluid-tight seal between the second adapter and inner sleeve. The first seal assembly and/or second seal assembly may include a sealing member and back-up ring. The back-up ring may have a tapered portion that may taper in a direction of a low-pressure side of the sealing assembly, and an end portion at the low pressure side configured to deform at or above at least one of a predetermined temperature and a predetermined pressure to create a clearance between the tapered portion and a wall of the recess.

17 Claims, 7 Drawing Sheets

(56) References Cited

U.S. PATENT DOCUMENTS

| | | | | |
|---|---|---|---|---|
| 4,489,916 A | * | 12/1984 | Stevens | F16J 15/3204 |
| | | | | 277/540 |
| 4,630,636 A | * | 12/1986 | Cutcher | F16K 41/04 |
| | | | | 137/315.35 |
| 4,671,354 A | * | 6/1987 | Henderson | E21B 33/1292 |
| | | | | 166/134 |
| 4,720,113 A | * | 1/1988 | Hertz, Jr. | F16J 15/20 |
| | | | | 277/342 |
| 5,879,010 A | * | 3/1999 | Nilkanth | E21B 33/1216 |
| | | | | 277/584 |
| 7,111,641 B2 | | 9/2006 | Marban et al. | |
| 7,793,944 B2 | | 9/2010 | Otuka | |
| 8,490,689 B1 | * | 7/2013 | McClinton | E21B 23/06 |
| | | | | 166/135 |
| 9,587,458 B2 | * | 3/2017 | Derby | E21B 33/1216 |
| 2010/0219592 A1 | * | 9/2010 | Tuckness | E21B 33/10 |
| | | | | 277/638 |
| 2019/0170254 A1 | * | 6/2019 | Taslakian | F16K 41/08 |
| 2021/0215253 A1 | * | 7/2021 | Prate | F16J 15/188 |

* cited by examiner

SEAL ASSEMBLY FOR A FLUID COUPLING

CROSS-REFERENCE TO RELATED APPLICATION

This application claims the benefit of U.S. Provisional Patent Application Ser. No. 62/928,662, filed on Oct. 31, 2019, the disclosure of which is hereby incorporated by reference in its entirety as though fully set forth herein.

TECHNICAL FIELD

The present disclosure generally relates to fluid couplings, including, but not limited to, quick-disconnect fluid couplings, that may be used in high temperature environments, and seal assemblies of such fluid couplings.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some fluid couplings may not be configured to withstand high temperatures for sufficient amounts of time. For example and without limitation, in high temperature environments, heat may be transferred relatively quickly to sealing members, which in some cases could permanently damage the sealing members and result in leaks.

There is a desire for solutions/options that minimize or eliminate one or more challenges or shortcomings of fluid couplings. The foregoing discussion is intended only to illustrate examples of the present field and should not be taken as a disavowal of scope.

SUMMARY

In embodiments, a fluid coupling may include a first adapter, a second adapter configured to selectively connect with and disconnect from the male adapter, an inner sleeve, a first seal assembly disposed in a recess of the first adapter and configured to form a fluid-tight seal between the first adapter and the inner sleeve, and a second seal assembly disposed in a recess of the second adapter and configured to form a fluid-tight seal between the second adapter and the inner sleeve. The first seal assembly and/or the second seal assembly may include a sealing member and a back-up ring. The back-up ring may have a tapered portion that may taper in a direction of a low-pressure side of the sealing assembly, and an end portion at the low pressure side configured to deform at or above at least one of a predetermined temperature and a predetermined pressure to create a clearance between the tapered portion and a wall of the recess.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIGS. 2A-7 are partial cross-sectional views generally illustrating embodiments of a fluid coupling with a seal assembly according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
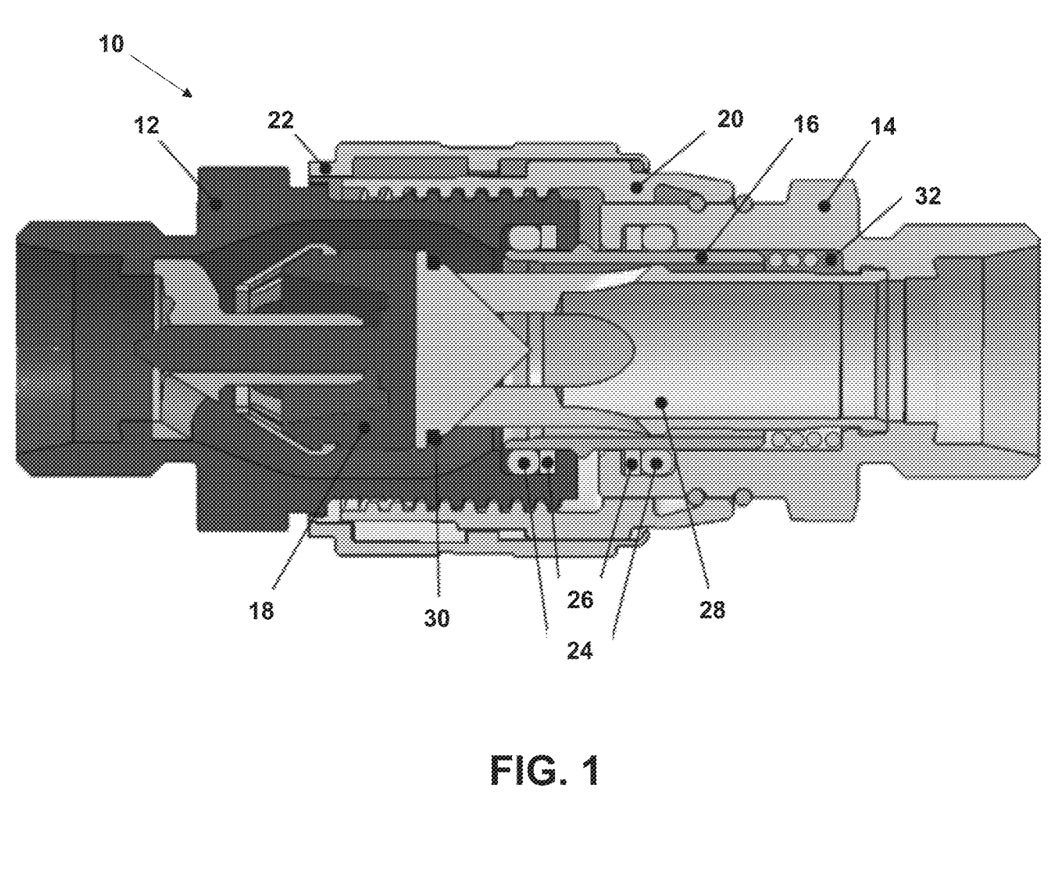
FIG. 1 is a cross-sectional view generally illustrating an embodiment of a fluid coupling according to teachings of the present disclosure.

As generally illustrated in FIG. 1, a fluid coupling 10 may include a first adapter 12 (e.g., a male adapter), a second adapter 14 (e.g., a female adapter), an inner sleeve 16 (e.g., a valve sleeve), a poppet valve 18, a nut 20, an outer sleeve 22 (e.g., a locking sleeve), one or more sealing members 24 (e.g., O-rings), one or more back-up rings 26, a tubular valve 28, and/or a bonded seal 30. The first adapter 12 may be configured for connection with a first fluid conduit. The second adapter 14 may be configured for connection with a second fluid conduit. The first adapter 12 and the second adapter 14 may be configured to provide fluid communication between the first fluid conduit and the second fluid conduit. The fluid coupling 10 may be configured as a quick-disconnect coupling.

In embodiments, in a disconnected position of the first adapter 12 and the second adapter 14, the inner sleeve 16 may contact the bonded seal 30 and a sealing member 24 connected to the second adapter 14, which may restrict and/or prevent fluid flow through the second adapter 14. The poppet valve 18 may contact a sealing member 24 connected to the first adapter 12, which may restrict and/or prevent fluid flow through the first adapter 12.

With embodiments, in a connected position of the first adapter 12 and the second adapter 14, such as generally illustrated in FIG. 1, a nut 20 may be connected to (e.g., threaded onto) a first adapter 12. As the nut 20 rotates, the first adapter 12 may drive an inner sleeve 16 in a first axial direction (e.g., toward the second fluid conduit), which may open one or more ports of a tubular valve 28. The inner sleeve 16 may then contact both of the sealing members 24, which may provide a fluid seal between the first adapter 12 and the second adapter 14 and/or allow fluid flow through the fluid coupling 10. A spring 32, such as a coil spring or other spring-like component, may provide an actuation force on the inner sleeve 16. The outer sleeve 22 may be disposed at least partially around the nut 20 to restrict and/or prevent the nut 20 from disconnecting (e.g., unscrewing) from the first adapter 12.

In embodiments, connecting and/or disconnecting the first adapter 12 and the second adapter 14 may include movement of the poppet valve 18, the inner sleeve 16, the nut 20, and/or the outer sleeve 22 relative to each other. Clearances may be provided between one or more of these components, such as to prevent binding during relative movement.

With embodiments, a fluid seal between the first adapter 12 and the second adapter 14 may depend, at least in part, on the integrity of one or more sealing members 24. The sealing members 24 may, for example and without limitation, comprise an organic material with elastomeric properties (e.g., rubber). At high pressures (e.g., at least about 1500 psig), back-up rings 26 may be configured to restrict deformation of the sealing members 24 into the clearances. The sealing members 24 may possibly start to degrade at high temperatures, such as about 600 degrees Fahrenheit or greater. If a sealing member 24 degrades to a certain extent, the fluid seal may be compromised, and fluid may leak from the fluid coupling 10.

In embodiments, such as generally illustrated in FIGS. 2A-11, a fluid coupling 10 may include a sealing assembly 40 disposed in a recess 42 in the first adapter 12 and/or the second adapter 14. The sealing assembly 40 may include a sealing member 44, which may be the same or similar to sealing member 24 described above, and a back-up ring 46. The back-up ring 46 generally may include a cylindrical portion 48, a tapered (e.g., frustoconical) portion 50, and/or an end portion 52. The cylindrical portion 48 may be adjacent the sealing member 44 and may be the same or similar to back-up ring 26 described above. The tapered portion 50 may taper (i.e., reduce in diameter) in a direction of a low-pressure side 60 of the sealing assembly 40 (or in a direction away from the cylindrical portion 48). The recess 42 may be at least partially tapered where the tapered portion 50 of the back-up ring 46 is disposed. At high pressures, the back-up ring 46 may be forced in an axial direction toward the low-pressure side 60 and wedged into the recess 42. A surface of the tapered portion of the recess 42 may then act against a surface of the tapered portion 50, causing the back-up ring 46 to vector radially inward against the inner sleeve 16, thereby creating a secure, fluid-tight seal with the inner sleeve 16. The end portion 52 may at least partially fill the recess 42 between the tapered portion 50 and the respective adapter 12, 14. At or above a predetermined temperature and/or a predetermined pressure, the end potion 52 may be configured to deform, thereby creating a clearance for the back-up ring 46 to move in the axial direction and vector radially inward via the engagement between the surfaces of the tapered portion 50 and the recess 42 to create the seal with the inner sleeve 16. Before the deformation of the end potion 52, the inner sleeve 16 may be freely movable with respect to the adapter 12, 14.

With embodiments, such as generally illustrated in FIGS. 2A, 2B, 3, and 8, the end portion 52 may serve as a spacer and may include a thermoplastic material having a lower strength or rigidity than the cylindrical portion 48 and the tapered portion 50. That is, an end portion 52 serving as a spacer may be weaker, or less rigid, than an associated cylindrical portion 48 and tapered portion 50. For example and without limitation, in some embodiments the material of the end portion 52 may deform and/or flow (for example, melt). However, in addition to or in lieu of melting, the material of the end portion 52 may have a lower glass transition temperature and/or a lower heat deflection temperature.

The cylindrical portion 48 and/or the tapered portion 50 may have a higher strength or rigidity than the end portion 52. At or above a predetermined temperature (e.g., above normal operating temperatures), the end portion 52 may deform and/or flow, thereby creating clearance for the back-up ring 46 to move and enable engagement of the tapered surfaces to create a seal with the inner sleeve 16. For example and without limitation, the predetermined temperature may be at or about 400 degrees Fahrenheit, or even above for some applications. As such, a seal with the inner sleeve 16 may be ensured well in advance of failure of the sealing member 44 at elevated temperatures (e.g., 600 degrees Fahrenheit).

Figure 2A:
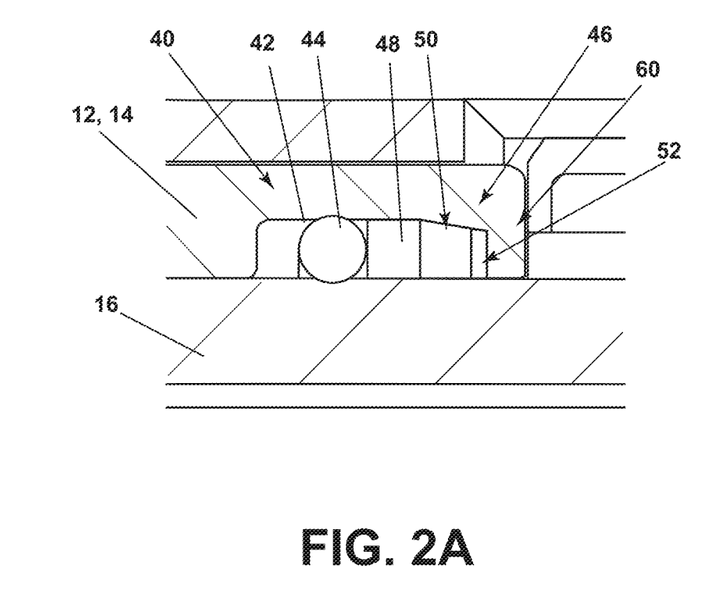
Figure 2B:
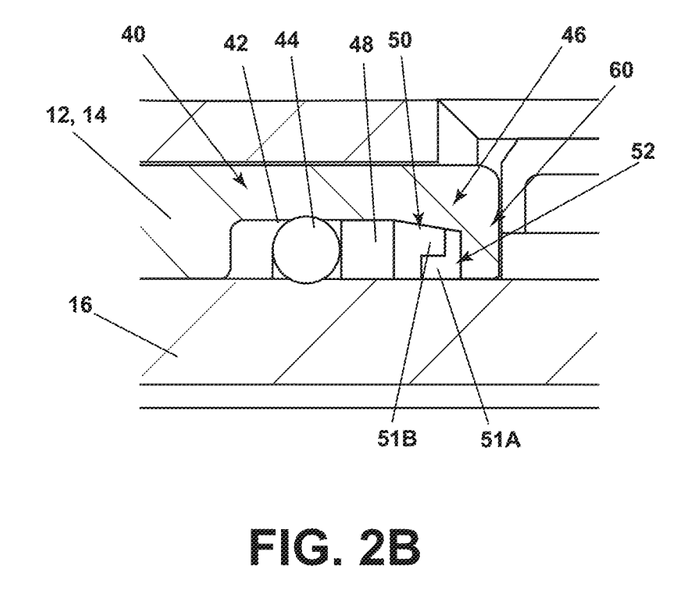
Figure 3:
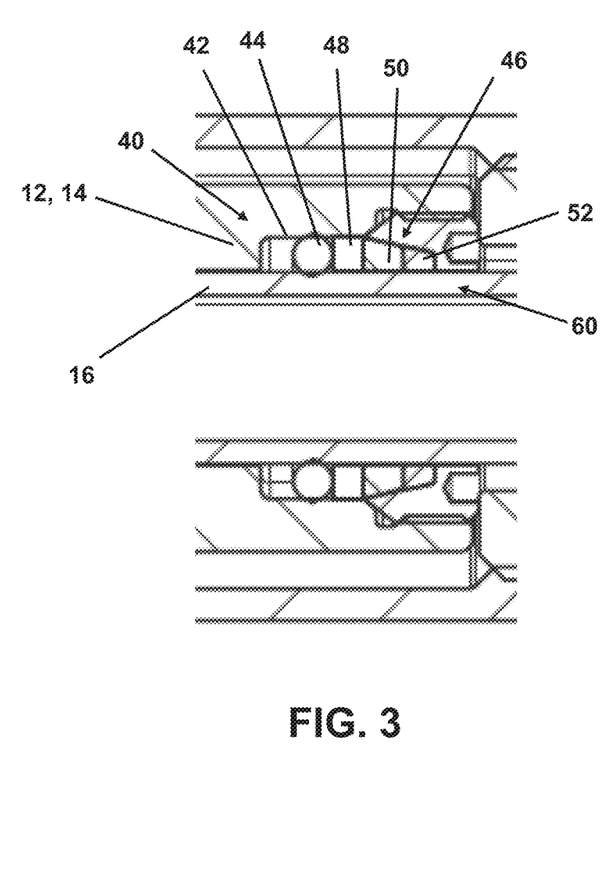

In an embodiment, such as generally illustrated in FIGS. 2A and 2B, back-up ring 46 may be comprised of, for example and without limitation, a cylindrical portion 48 that may be comprised of a material, such as PTFE, that may be strengthened with fillers (such as glass or carbon fibers), a tapered portion 50 that is generally rigid and may be comprised of a thermally-activated material (such as PEEK, although, it also could be comprised of polyamides, such as polybenzimidazole), and an end portion 52 that may have a comparatively lower strength or rigidity at elevated temperature (than the cylindrical portion and the tapered portion) and may be comprised of PTFE (e.g., with fillers that differ from the cylindrical portion 48 or with no fillers). In an embodiment, the back-up ring 46 may function up to about 600 F-800 F, with the softening and movement of the end portion starting to activate (soften/move) around about 400 F to 500 F.

As generally illustrated in the embodiment of a back-up ring 46 shown in FIG. 2A, tapered portion 50 may comprise, for example, a comparatively rigid backup ring that vectors under pressure; and end portion 52 may comprise, for example, a comparatively low strength thermoplastic.

As generally illustrated in an alternate embodiment of a back-up ring 46 such as shown in FIG. 2B, at least a portion of the end portion 52 may be concave at the low pressure side 60. The end portion 52 and the tapered portion 50 may each include respective lips 51A and 51B that are in contact with each other in the radial direction. As such, when the end portion 52 deforms (e.g., melts), the lip 51B of the tapered portion 50 may be left overhanging in the recess 42. In the event of a leak such that fluid enters the recess 42, the fluid may act on the lip radially upward simultaneous with the vectoring of the back-up ring 46 downward against the inner sleeve 16, thereby creating an additional seal with the respective adapter 12, 14.

Figure 4:
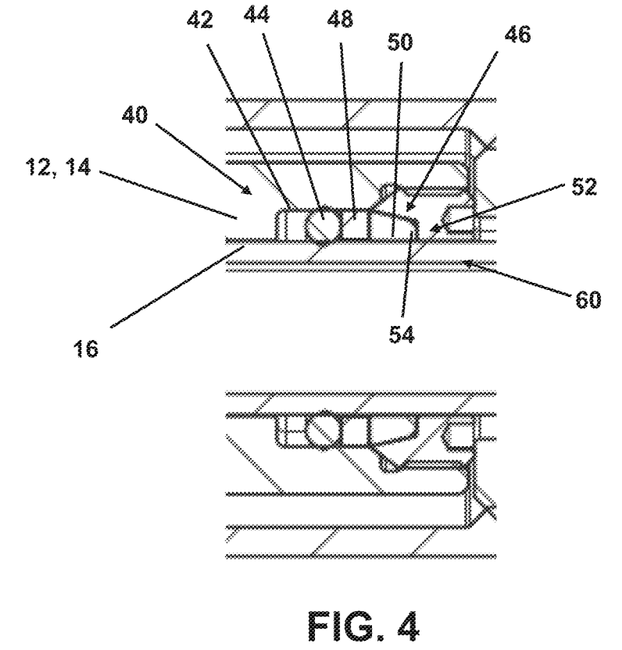
Figure 5:
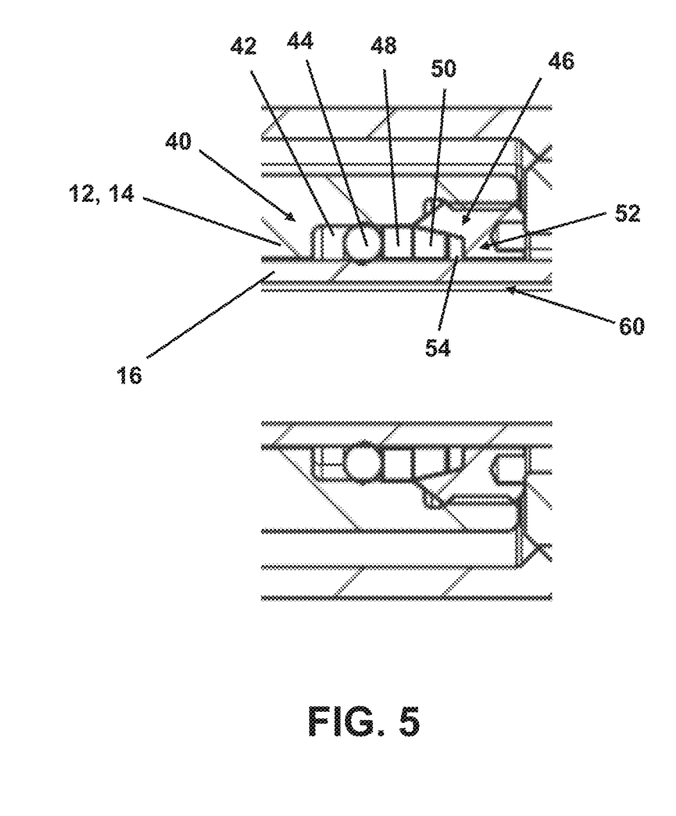
Figure 9:
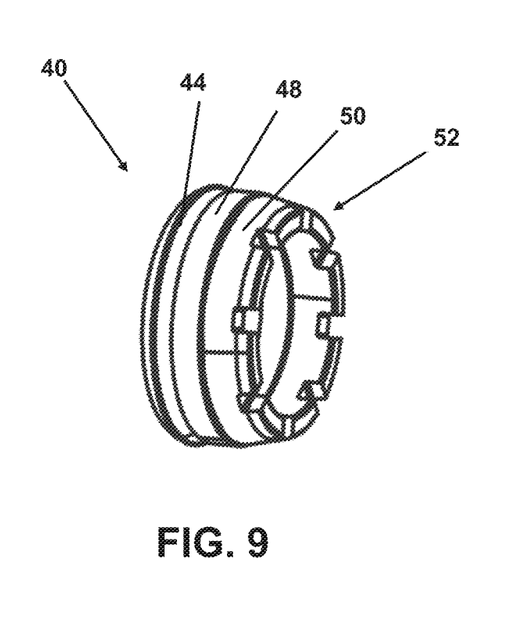

With embodiments, such as generally illustrated in FIGS. 4, 5, and 9, an end portion 52 may be integral with an axial end of the tapered portion 50, and may include or comprise one or more axially-extending ribs 54 configured to deflect or otherwise deform at normal operating pressure and/or at or above a predetermined temperature (e.g., elevated temperatures above normal operating temperature). The rib(s) 54 generally may reduce the surface area in contact with the wall of the recess 42 such that the ribs may more easily yield or deform upon high stress, thereby creating the clearance for the back-up ring 46 to move and enable engagement of the surfaces of the tapered portion 50 and the recess 42 to create the seal with the inner sleeve 16. For example and without limitation, the predetermined temperature may be at or about 400° F., or even above for some applications.

Figure 6:
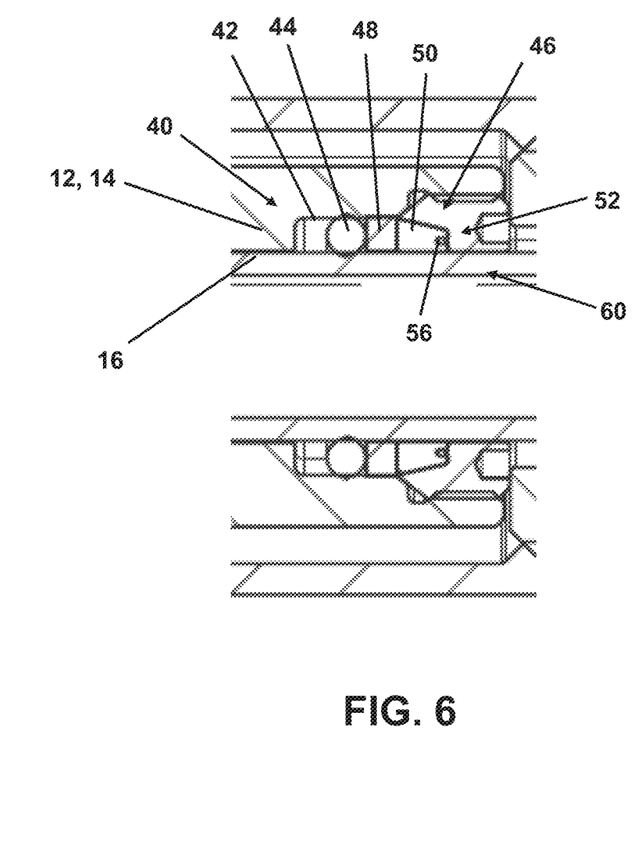
Figure 10:
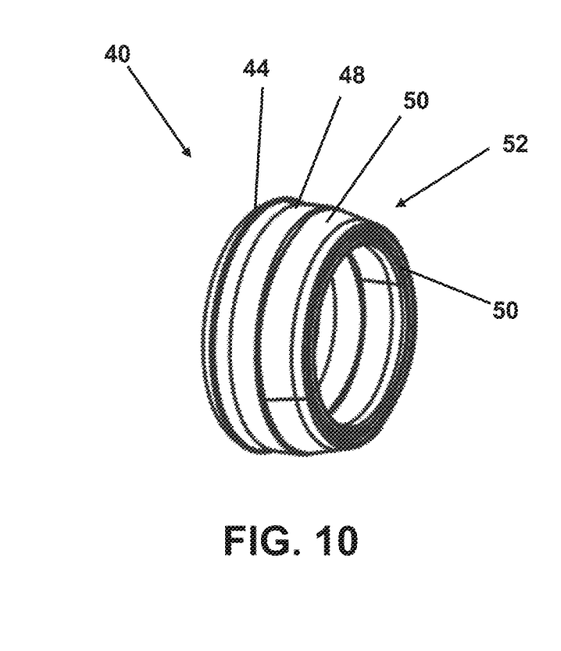

In embodiments, such as generally illustrated in FIGS. 6 and 10, the end portion 52 may be integral with an axial end of the tapered portion 50, and may include or comprise a circumferential channel or groove 56 extending axially in the tapered portion 50. The axial end may then be configured to deflect or otherwise deform at normal operating pressure and/or above a predetermined temperature (e.g., elevated temperatures above normal operating temperature). The channel 56 generally may reduce the surface area of the axial end of the tapered portion 48 in contact with the wall of the recess 42 such that the axial end may more easily yield or deform upon high stress, thereby creating clearance for the back-up ring 46 to move and enable engagement of the surfaces of the tapered portion 50 and the recess 42 to create a seal with the inner sleeve 16. For example and without limitation, the predetermined temperature may be at or about 400° F., or even above for some applications.

Figure 7:
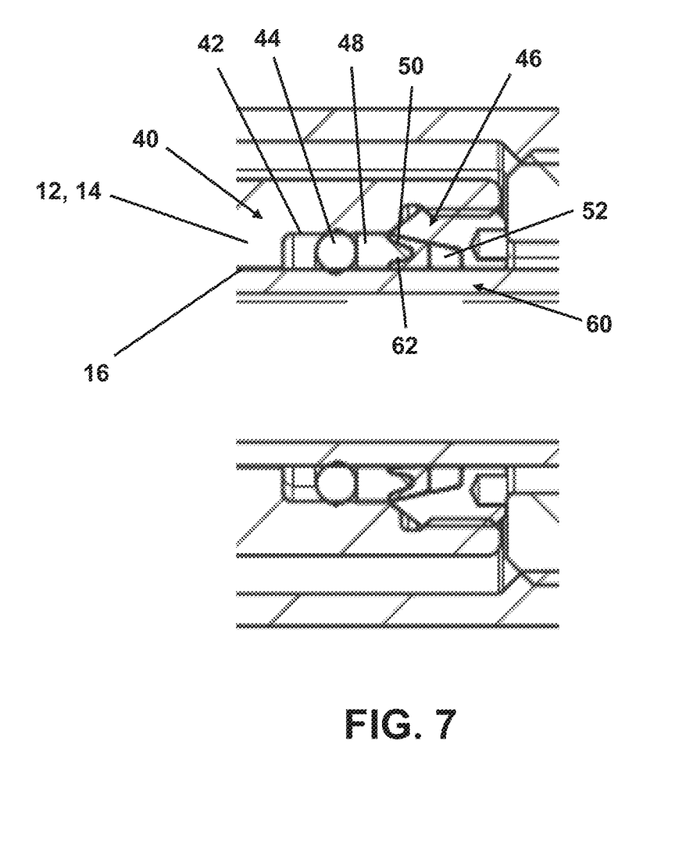
Figure 8:
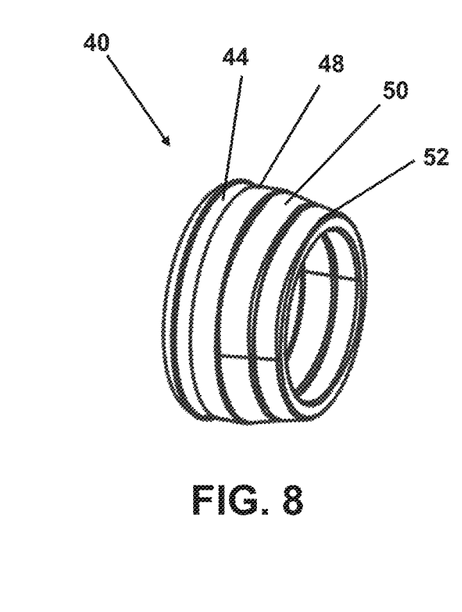
FIGS. 8-11 are perspective views generally illustrating embodiments of a seal assembly according to teachings of the present disclosure.
Figure 11:
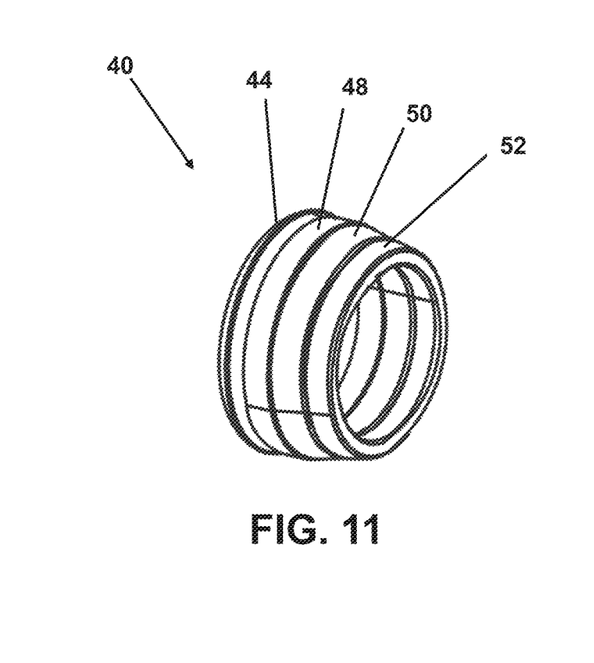

In embodiments, such as generally illustrated in FIGS. 7 and 11, the tapered portion 50 may include a concavity 62 in an axial end facing the cylindrical portion 48 (e.g., at a high pressure side of the seal assembly 40). A portion of the cylindrical portion 48 may extend into the concavity 62. At normal operating pressure and/or above a predetermined temperature (e.g., elevated temperatures above normal operating temperatures), the engagement between the portion of the cylindrical portion 48 and the tapered portion 50 in the concavity may force the tapered portion 50 radially and/or axially into engagement with the inner sleeve 16 and/or the tapered surface of the recess 42 to create a fluid-tight seal. For example and without limitation, the predetermined temperature may be at or about 400° F., or even above for some applications. In the event that a sealing member 44 degrades, fluid pressure may act on the concavity 62 radially simultaneously with the vectoring of the back-up ring 46 downward against the inner sleeve 16, which may thereby improve the seal with respect to a respective adapter 12.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A seal assembly for a fluid coupling, comprising:
    a sealing member; and
    a back-up ring having:
        a tapered portion that tapers in a direction of a low pressure side of the seal assembly; and
        an end portion at the low pressure side configured to deform at or above at least one of a predetermined temperature and a predetermined pressure;
        wherein the end portion has a first material composition, wherein the tapered portion has a second material composition different from the first material composition, wherein the first material composition has a lower strength or rigidity than the second material composition at the predetermined temperature; wherein the end portion is configured to be located at an end of the back-up ring; and wherein both the tapered portion and the end portion are portions of the back-up ring.

2. The seal assembly of claim 1, wherein the end portion has a lower strength, rigidity, and/or melting point at or above about 400 degrees Fahrenheit.

3. The seal assembly of claim 1, wherein at least one of:
    at least a portion of the end portion is concave at the low pressure side; and the end portion and the tapered portion include respective lips in contact with each other in a radial direction.

4. The seal assembly of claim 1, wherein the end portion includes a circumferential groove extending axially in an end of the tapered portion.

5. The seal assembly of claim 1, wherein the end portion includes at least one axially extending circumferential rib.

6. The seal assembly of claim 1, wherein the end portion includes a plurality of axially extending ribs spaced circumferentially.

7. The seal assembly of claim 1, wherein the back-up ring includes a cylindrical portion adjacent the tapered portion in a direction of a high pressure side of the seal assembly.

8. The seal assembly of claim 7, wherein the back-up ring includes a concavity facing the cylindrical portion and into which a portion of the cylindrical portion extends.

9. The seal assembly of claim 1, wherein the sealing member is an O-ring.

10. The seal assembly of claim 1, wherein the first material composition starts to activate at the predetermined temperature to provide increased softening and movement of the end portion as compared to the tapered portion.

11. The seal assembly of claim 10, wherein the predetermined temperature is at or above 400 degrees Fahrenheit.

12. The seal assembly of claim 1, wherein the first material composition includes PTFE, and the second material composition includes PEEK or a polyamide.

13. The seal assembly of claim 1, further comprising a cylindrical portion having a third material composition different from the first and second material compositions, wherein the tapered portion is positioned between the cylindrical portion and the end portion, and wherein the strength or rigidity of the first material composition is lower than that of the third material composition at the predetermined temperature.

14. The seal assembly of claim 13, wherein the third material composition includes PTFE with fillers, the first material composition includes PTFE with no fillers or fillers at a different level than the fillers of the third material composition, and wherein the second material composition includes PEEK or a polyamide.

15. The seal assembly of claim 13, wherein the third material composition includes a first thermoplastic material with fillers, the first material composition includes a second thermoplastic material with no fillers or fillers at a different level than the fillers of the third material composition.

16. The seal assembly of claim 15, wherein the first thermoplastic material and the second thermoplastic material are the same material.

17. The seal assembly of claim 13, wherein the back-up ring has an outer diameter that tapers from a major outer diameter at an interface between the cylindrical portion and the tapered portion to a minor outer diameter located at an axial end of the back-up ring, wherein the axial end of the back-up ring is defined by the end portion.

* * * * *